Figure 1:
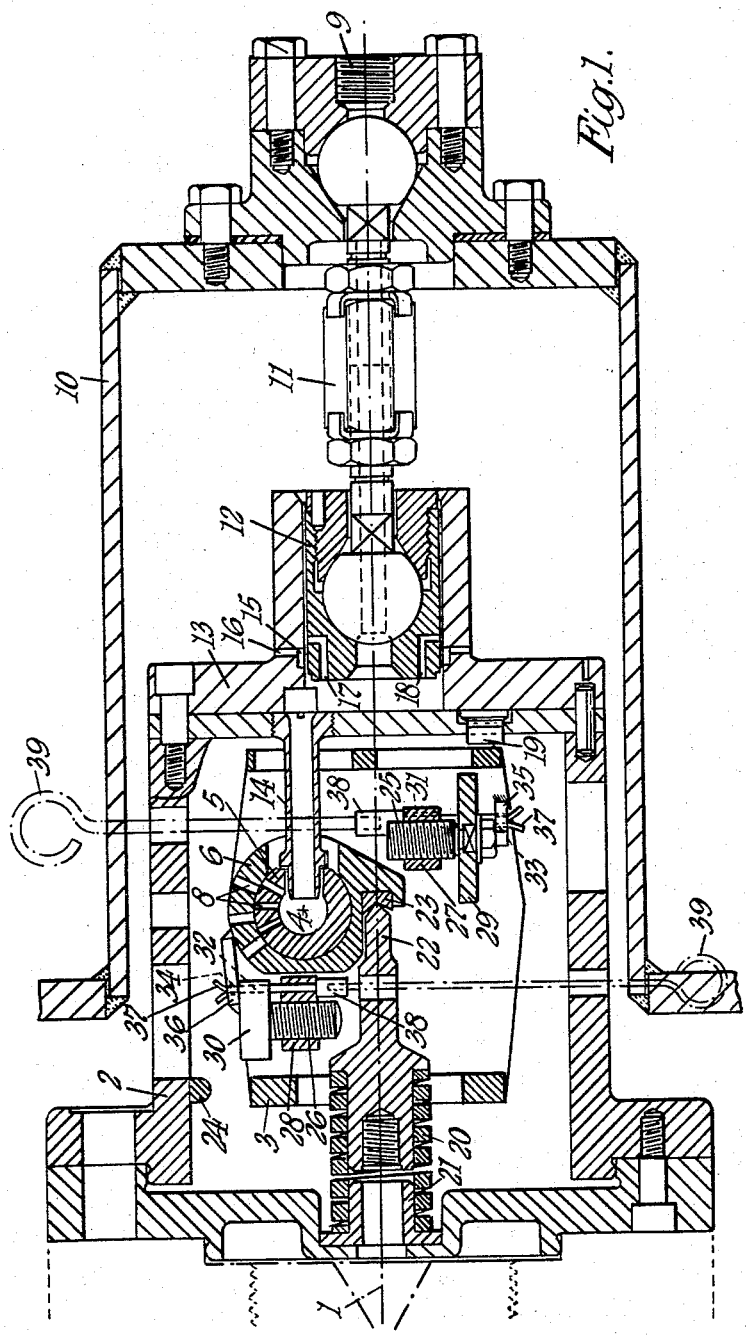

Dec. 20, 1966   H. E. C. HIMS   3,292,649
OVERSPEED GOVERNOR
Filed Dec. 26, 1963   2 Sheets-Sheet 1

3,292,649
OVERSPEED GOVERNOR
Herbert E. C. Hims, Wallsend, England, assignor to Pametrada, Wallsend, England, a British body corporate
Filed Dec. 26, 1963, Ser. No. 333,504
Claims priority, application Great Britain, Feb. 8, 1963, 5,277/63
5 Claims. (Cl. 137—56)

In my copending application Ser. No. 188,722 which was issued as Patent No. 3,196,889 on July 27, 1965, there is described an overspeed governor for limiting the maximum speed of a rotary member, comprising a rocking member, pivoted to the rotary member on an axis in a plane at right angles to the axis of rotation of the rotary member, the rocking member being arranged so that the centrifugal forces acting on the rocking member are not in equilibrium about said pivot axis when the rotary member is rotated, and the rocking member being mounted so as to be rockable through a small angle about the pivot axis against the action of at least one spring, the arrangement being such that when the rotary member is rotated above a predetermined speed, the rocking member rocks against the action of said at least one spring, indicating means responsive to this rocking action being incorporated to indicate when said predetermined speed is exceeded. Such a governor may be fitted to, for example, a ship's turbine, and though a main turbine will normally have its axis of rotation running generally fore and aft, auxiliary turbines may have their axes running for example generally athwartships or vertically. Thus although any acceleration due to rectilinear shocks is normally of least magnitude in the fore and aft direction, it is desirable that governors for use on any machine afloat be shock-proof against shock in any linear direction, and it is an object of this invention to provide such a governor. Shock proofing in a particular direction is obtained by ensuring that an impulsive acceleration of the rocking member in that direction does not result in a moment being applied about the rocking axis, which could cause the rocking member to rock and operate the indicating means. In order to obtain this condition, the rocking member must be in static equilibrium about the rocking axis in respect of forces arising from impulsive accelerations applied in the said particular direction. Components of said forces parallel with the rocking axis have no tendency to rock the rocking member, and so shock proofing may be obtained by obtaining static equilibrium in two mutually perpendicular directions normal to the rocking axis. The magnitudes of shocks in rotary directions are normally small enough to be negligible.

This invention consists in an overspeed governor for limiting the maximum speed of a rotary member, comprising spring means, a rocking member pivoted to the rotary member on an axis in a plane at right angles to the axis of rotation of the rotary member, the rocking member being dynamically out-of-balance about the axis of rotation so that when the rotary member is rotated, centrifugal forces acting on the rocking member produce a couple about the pivot axis against the action of the said spring means, whereby when the rotary member is rotated at a speed above a predetermined value the rocking member rocks against the action of the spring means, and indicating means responsive to the rocking action to indicate when the predetermined speed is exceeded, the rocking member being statically balanced with respect to inertia force components normal to the pivot axis, and means for adjusting this dynamic imbalance to vary the said predetermined speed, the said varying means comprising at least two masses mounted on the rocking member for adjustment towards and away from the axis rotation.

In order to change the tripping speed without upsetting shock proofing, both adjustable masses must be adjusted by amounts such that the variations of the product of mass by distance from the reference plus are equal and opposite.

The indicating means may merely initiate the actuation of a relay to operate a warning means or may for instance initiate the actuation of a relay to reduce or cut-off a power supply for rotating the rotary member.

In one arrangement, said indicating means comprises a rotary valve constituting a pressure fluid exit from a duct provided for connection to a relay and arranged to be opened when the rocking member rocks.

Preferably, said pivot axis does not intersect with said axis of rotation, and in this arrangement said at least one spring may be a helical spring with its axis on said axis of rotation.

Adjusting means may be provided for altering the value of said predetermined speed, and the adjusting means may include screw means for altering the radius of rotation of the out-of-balance mass which is dynamically out-of-balance about the axis of rotation when the rotary member is rotated. At least two adjustable masses may be provided on said rocking member, one on either side of said pivot axis and arranged such that their positions on the rocking member can be altered to correct the static balance of the rocking member about said pivot axis and to adjust the value of said predetermined speed. In order to change the tripping speed without upsetting the shock-proofing, both masses must be adjusted by equal amounts of the product of mass and distance from the reference planes.

To promote quiet running, it is desirable that the governor as a whole should be dynamically balanced about its axis of rotation, i.e. should have its centre of gravity lying on its axis of rotation.

Figure 2:
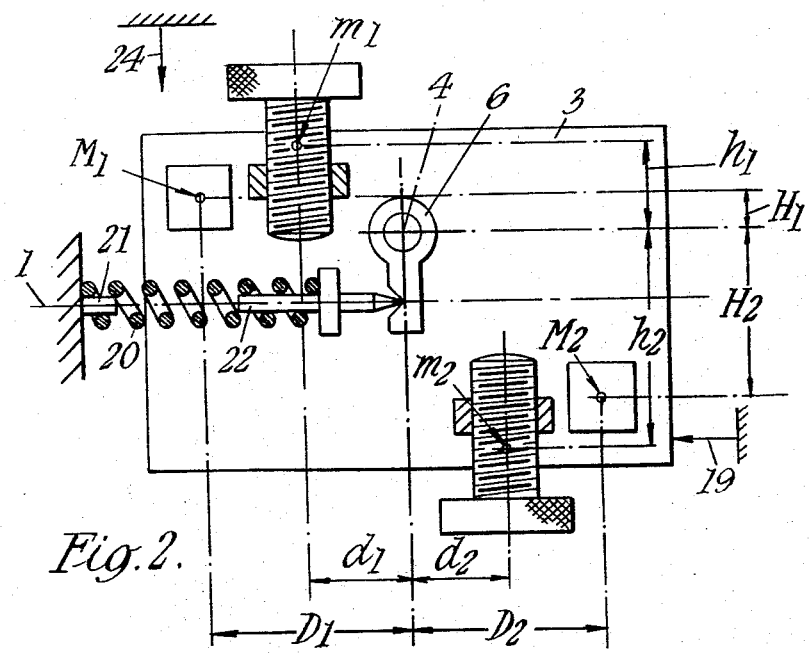

The invention will be further described, by way of example, with reference to the accompanying drawings, in which:

FIGURE 1 is a slightly simplified view, mainly in axial cross-section, of an overspeed governor for a turbine shaft; and FIGURE 2 is a schematic diagram illustrating the shock proofing of the governor shown in FIGURE 1.

The turbine shaft and the governor are mounted for rotation about an axis 1. The governor has a cage 2 in which a rocking member 3 is pivoted about an axis 4 on a pivot 5. The pivot 5 is embraced by a cross-sleeve 6 forming part of the member 3 and the pivot 5 and cross-sleeve 6 form a rotary valve having approximately radial ports 8. The governor is intended for use with a lubricating oil relay of the type that operates on a release of pressure from a system to which the supply of oil is restricted, and a connection 9 is provided for connecting the governor to such a relay. The connection 9 is provided in a stationary cage 10 which partially surrounds the governor, and oil is supplied through a spherical-ended axially-bored dumbbell 11 which is equipped on its governor side with a piston 12 which is free to rotate in a bore in a cage and plate 13, as well as to move axially with respect to this bore. A bore in the forward end of the piston 12 communicates via the interior of a stub 14 with the interior of the pivot 5. In addition, an annulus 15 with radial drain channels 16 is provided in the bore and this annulus 15 can communicate with release channels 17 or 18 if the relative axial motion of the piston 12 and the end plate 13 exceeds predetermined limits.

The rocking member 3 is biased against a stop 19 by means of a helical spring 20 mounted between a boss 21 and a knife-edged member 22, with the longitudinal axis of the spring on the axis of rotation 1; the knife edge of the knife-edged member 22 is supported by a V-block 23 mounted on the cross-sleeve 6. A stop 24 is provided to limit the rocking of the rocking member 3.

Two screw adjusting slugs 25 and 26 are screwed into bosses 27 and 28 forming part of the rocking member 3; in the present embodiment, it is advantageous that these two slugs 25 and 26 are not of identical shape, the slug 25 carrying a disc 29 of substantial mass and the slug 26 having a head 30. The disc 29 and the head 30 each have at least one hole which can be aligned with holes 31, 32 or 33, 34 in the bosses 27 or 29 in lugs 35 or 36 forming part of the rocking member 3. The slugs 25 and 26 can be locked by means of split pins 37 integral with ferrules 38; the split pins 37 can be inserted by means of handles 39 which can screw into the ferrules 38.

In operation, when the rotational speed of the governor reaches said predetermined speed, the rocking member 3 rocks about its axis 4 against the action of the spring 20 and opens the ports 8, thus venting the oil relay. It will be appreciated that any stiction must be taken into account when adjusting the governor. If the relative axial movement between the piston 12 and the end plate 13 exceeds a predetermined limit, for instance due to a thrust bearing failure or excessive relative expansion, the oil relay will be vented either through release channels 17 and 18, annulus 15 and drain channel 16, or directly through annulus 15 and drain channel 16 when the piston retracts such that its forward end communicates with the annulus 15.

In FIGURE 2, the rocking member 3 has its mass resolved into two point masses $M_1$ and $M_2$, and the screw slugs 25 and 26 are represented by point masses $m_1$ and $m_2$. On rotation about the axis 1, the rocking member 3 will experience a moment about axis 4 trying to rock the member 3 clockwise about axis 4, this rocking motion being resisted by the compression spring 20. The distribution of the masses $M_1$, $M_2$, $m_1$, and $m_2$ must be such that the rocking moment arising from the rotation about the axis 1 will tend to move the member 3 so that the potential energy of the member 3 with respect to the axis 1 decreases, the member 3 thus being dynamically out-of-balance about the axis 1 but statically balanced about the axis 4 in order to provide shock-proofing in any linear direction. To provide static balance about the axis 4, $$M_1 D_1 + m_1 d_1 = M_2 D_2 + m_2 d_2$$

and $$M_1 H_1 + m_1 h_1 = M_2 H_2 + m_2 h_2$$

where $H_1$, $H_2$, $h_1$ and $h_2$ are the respective distances of masses $M_1$, $M_2$, $m_1$ and $m_2$ from two planes mutually at right angles, both containing the axis 4 and one being normal to the axis 1. It will be noted that there is no need to provide specifically for components of shock along the axis 4 as the rocking member 3 has no degree of rotary freedom other than about axis 4.

The governor will trip when such a speed of rotation about the axis 1 is attained that the moments arising from centrifugal forces acting on the masses $M_1$, $m_1$, $M_2$ and $m_2$ exceed the moment arising from the compression of the spring 20, and the trip speed can be adjusted by setting the two masses $m_1$ and $m_2$ to appropriate positions.

I claim:

1. An overspeed governor for limiting the maximum speed of a rotary member, comprising spring means, a rocking member pivoted to the rotary member on an axis in a plane at right angles to the axis of rotation of the rotary member, the rocking member being dynamically out-of-balance about the axis of rotation so that when the rotary member is rotated, centrifugal forces acting on the rocking member produce a couple about the pivot axis against the action of the said spring means, whereby when the rotary member is rotated at a speed above a predetermined value the rocking member rocks against the action of the spring means, and indicating means responsive to the rocking action to indicate when the predetermined speed is exceeded, the rocking member being statically balanced with respect to inertia force components normal to the pivot axis, and means for adjusting the dynamic imbalance to vary the said predetermined speed, the said rocking means comprising at least two masses mounted on the rocking member for adjustment towards and away from the axis of rotation.

2. An overspeed governor as claimed in claim 1, in which the indicating means comprises a fluid pressure relay, a duct connected to said relay, and a rotary valve constituting a pressure fluid exit from the said duct, said rotary valve including a movable member connected to the rocking member and aranged to open said valve upon rocking of the rocking member.

3. An overspeed governor as claimed in claim 2, in which the duct further includes fluid exit means, and means for opening said fluid exit means to operate said relay upon axial movement of the rotary member.

4. An overspeed governor as claimed in claim 1, in which the pivot axis is offset from the said axis of rotation.

5. An overspeed governor as claimed in claim 4, in which the spring is a helical spring with its axis along the said axis of rotation.

References Cited by the Examiner

UNITED STATES PATENTS

| | | | |
|---|---|---|---|
| 2,375,429 | 5/1945 | Martin | 137—56 X |
| 2,929,389 | 3/1960 | Jacobs | 137—56 |
| 3,147,760 | 9/1964 | Mansfield | 137—56 |
| 3,191,610 | 6/1965 | Zeisloft | 137—56 X |
| 3,196,889 | 7/1965 | Hims | 137—56 |

FOREIGN PATENTS 117,262   10/1918   Great Britain.

ALAN COHAN, *Primary Examiner.*

CLARENCE R. GORDON, *Assistant Examiner.*